W. J. SMITH.
MOTOR PROPELLED TRUCK.
APPLICATION FILED OCT. 25, 1919.

1,357,192.

Patented Oct. 26, 1920.
3 SHEETS—SHEET 1.

INVENTOR.
WILLIAM JUDSON SMITH.
BY HIS ATTORNEYS.

W. J. SMITH.
MOTOR PROPELLED TRUCK.
APPLICATION FILED OCT. 25, 1919.

1,357,192.

Patented Oct. 26, 1920.
3 SHEETS—SHEET 3.

INVENTOR.
WILLIAM JUDSON SMITH.
BY HIS ATTORNEYS.

UNITED STATES PATENT OFFICE.

WILLIAM JUDSON SMITH, OF MINNEAPOLIS, MINNESOTA.

MOTOR-PROPELLED TRUCK.

1,357,192.  Specification of Letters Patent.  Patented Oct. 26, 1920.

Application filed October 25, 1919. Serial No. 333,156.

*To all whom it may concern:*

Be it known that I, WILLIAM JUDSON SMITH, a citizen of the United States, residing at Minneapolis, in the county of Hennepin and State of Minnesota, have invented certain new and useful Improvements in Motor-Propelled Trucks; and I do hereby declare the following to be a full, clear, and exact description of the invention, such as will enable others skilled in the art to which it appertains to make and use the same.

My invention relates to motor propelled vehicles and is particularly intended to improve the construction of motor propelled vehicles of the evener type, such as trucks, buses, and the like. Generally stated, the invention consists of the novel devices and combinations of devices hereinafter described and defined in the claims.

The invention is directed chiefly to the provision of a self-contained rear truck comprising four wheels, a truck frame and an internal combustion engine mounted on said frame, so as to constitute a complete motor propelled truck or power unit.

The invention is illustrated in the accompanying drawings wherein like characters indicate like parts throughout the several views. Referring to the drawings.

Figure 1:
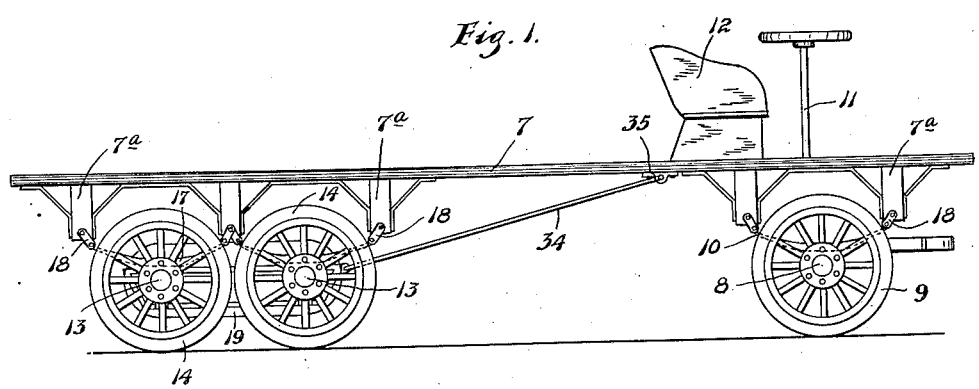
Figure 1 is a side elevation showing my improved self-contained truck incorporated in a motor propelled vehicle.
Figure 2:
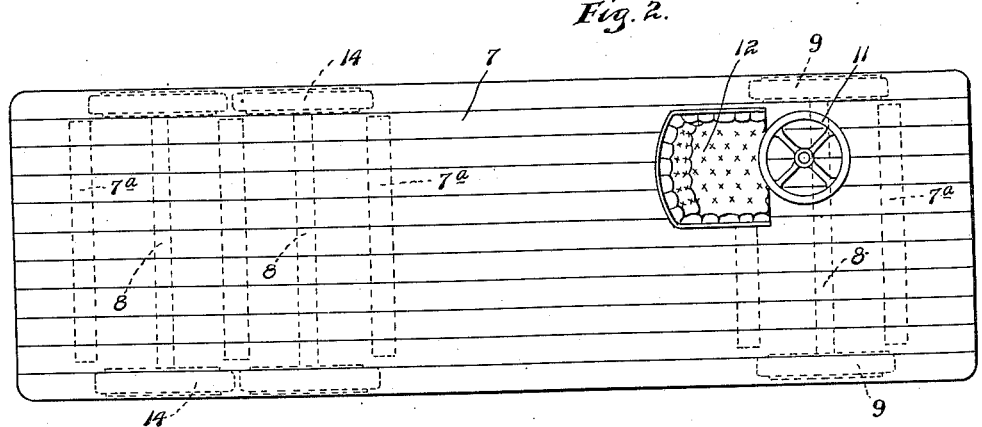
Fig. 2 is a plan view of the parts shown in Fig. 1.
Figure 3:
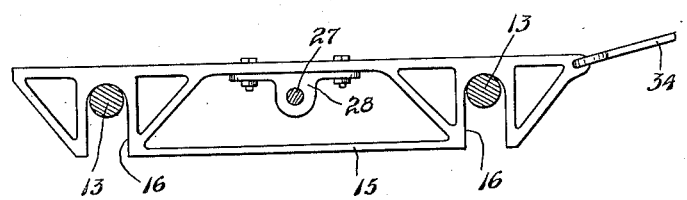
Fig. 3 is a side elevation of one of the truck side frames.
Figure 4:
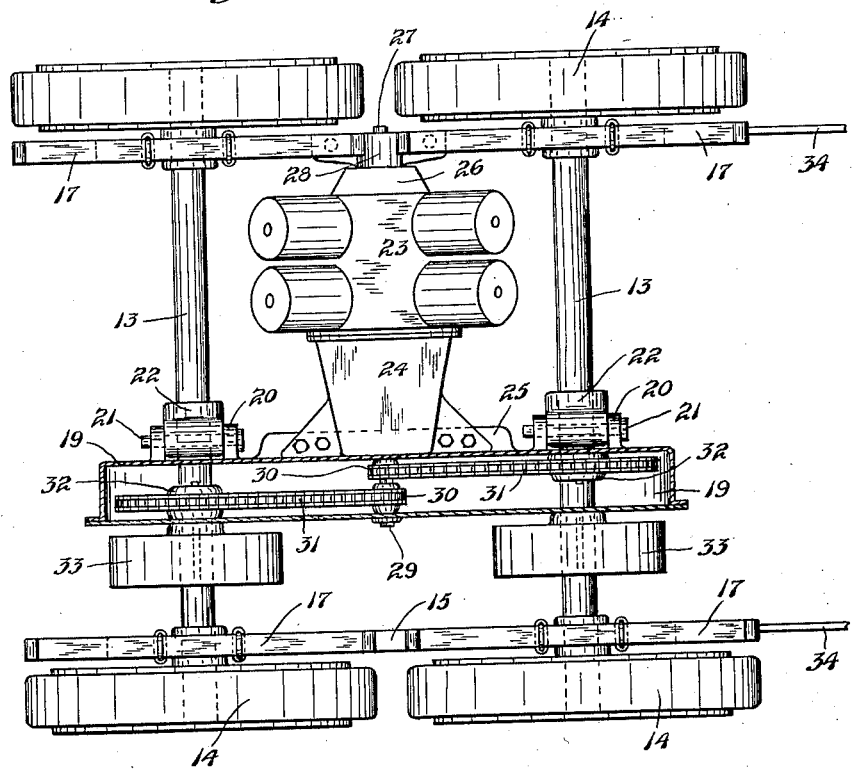
Fig. 4 is a plan view of the self-contained truck, some parts being shown in horizontal section.

The body of the truck is shown as of a flat structure or platform 7, the front portion of which is made in the customary way on a front truck comprising the usual front axle 8, front steering wheels 9 and springs 10. The front wheels would preferably be steered by the customary steering post 11 within reach of the driver's seat 12.

The self-contained rear truck comprises two axles 13 and two pairs of laterally spaced wheels 14, the said wheels being rigidly secured on the ends of the said axles. The numeral 15 indicates truck side frames located adjacent to the inner sides of the wheels and having axle seats 16 that rest loosely, or otherwise, on the axles 13. The truck supporting springs 17, at their central portions are anchored on the tops of the side frames 15, and at their ends, they are connected to the bolster 7ª of the truck body 7, preferably by links 18.

The numeral 19 indicates a driving gear housing which is an elongated hollow closed structure, through the sides of which the axles 13 are passed with freedom for slight vertical movements. The housing 19 is shown as provided with laterally projecting lugs 20, which, by pins 21, are pivoted to large bearing sleeves 22 in which the intermediate portions of the axles 13 are journaled.

The motor is shown as in the form of a multicylinder internal combustion engine 23 of the V type. The crank shaft chamber of this engine 23, at one side, is rigidly secured to a transmission gear casing 24 which, in turn, is bolted, or otherwise rigidly secured to a flange 25 on the adjacent side of the gear housing 19. The crank casing of the said engine, at the opposite side, has an extension 26 with trunnion 27, or the like, that is swiveled in a bearing 28 on the adjacent truck side frame 15. This manner of mounting the engine and connecting the frame elements affords a three-point support for the engine, permits the truck side frames 15 to oscillate vertically, the one independently of the other and also permits the axles 13 to oscillate vertically on the pivot pins 21 so that the four truck wheels, without straining any of the truck elements, may adapt themselves to irregularities in the road.

Within the transmission casing 24 will be located the usual or any suitable variable speed reversing transmission gear mechanism which will drive the shaft 29 that is journaled in the central portion of the housing 19 and is provided within said housing with two sprockets 30. Sprocket chains 31 run over the sprockets 30 and over sprocket wheels 32 on the respective axles 13. All of these transmission elements may be arranged to run in oil. Adjacent to the outer side of the housing 19, the axles 13 are shown as provided with brake drums 33 with which the customary brake bands may coöperate in the usual way.

As is evident, the four wheeled rear truck above described is a complete truck and power unit capable of being placed under any kind of truck or motor propelled vehicle.

To take the forward and rear thrust between the rear truck and body of the vehicle, laterally spaced thrust bars 34 are provided and these are preferably pivoted at their rear ends to the front ends of the truck side frames 15, and at their front ends, to bearings 35 on the truck body. This relieves the rear truck springs from forward and rearward thrusts, both in going ahead and in backing up.

Figure 5:
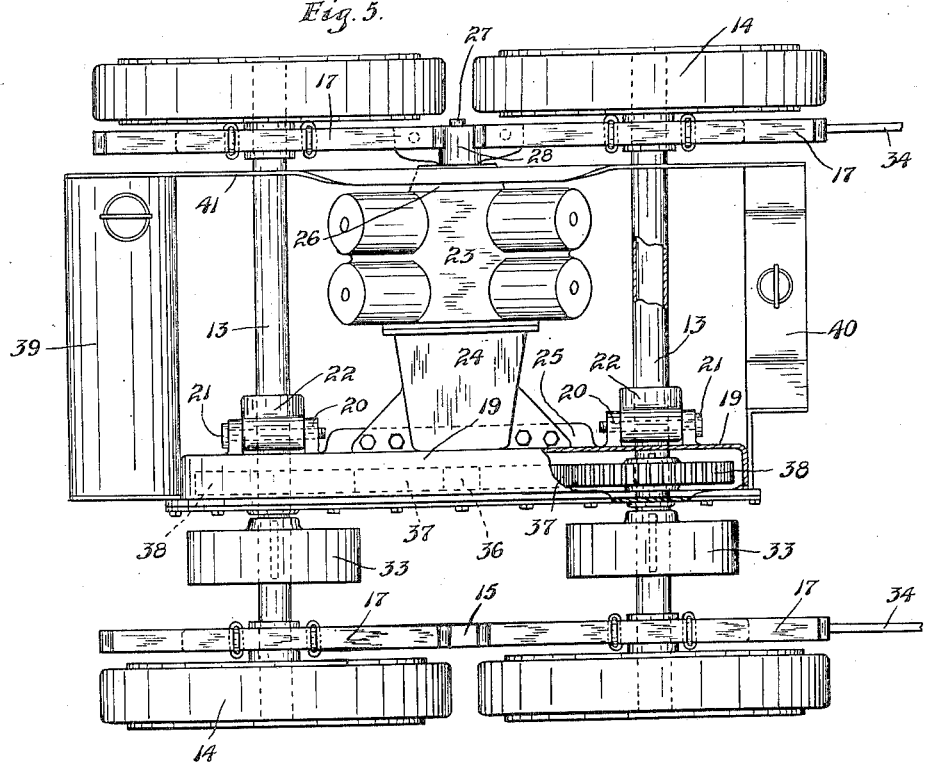
Fig. 5 is a plan view of the self-contained truck showing a modified form of the driving gear.
Figure 6:
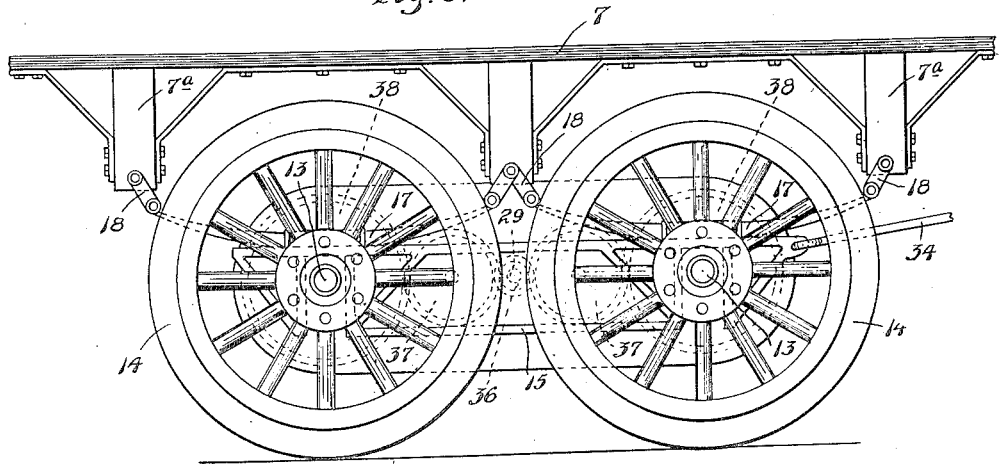
Fig. 6 is a side elevation of the truck shown in Fig. 5.

In the construction illustrated in Figs. 5 and 6, shaft 29 is provided with a spur pinion 36 that meshes with intermediate gears 37 journaled to and within the housing 19, and these intermediate gears 37 mesh with spur gears 38 on the axles 13.

The numeral 39 indicates a gasolene tank and the numeral 40 the radiator of the power unit. At one side, the tank 30 and radiator 40 are attached to the housing 19, but at the opposite side of the truck they are attached to a balance bar 41 which, in turn, is secured at its intermediate portion to the extended end of the crank case of the engine 23. In this way, the radiator and tank are carried by the triangular structure made up of the housing 19 and the base of the engine, and hence, indirectly, are carried on the three bearings at 22, 26 and 27.

What I claim is:

1. A self-contained power driven truck comprising front and rear axles and wheels thereon, laterally spaced truck side frames carried on said axles, a gear housing carried on said axles but permitting the latter to oscillate vertically, one in respect to the other, an engine having its body connected to said gear housing, and to one of the side frames, and carried thereby, and driving connections between said engine and said axles.

2. A self-contained power driven truck comprising front and rear axles and wheels thereon, laterally spaced truck side frames mounted on said axles, a gear housing pivotally mounted on said axles to permit the two axles to oscillate vertically, one in respect to the other, an internal combustion engine rigidly secured to said housing and having a pivotal connection with one of said truck side frames, and driving connections between said engine and said axles.

3. A self-contained power driven truck comprising front and rear axles and wheels thereon, laterally spaced truck side frames mounted on said axles, a gear housing pivotally mounted on said axles to permit the two axles to oscillate vertically, one in respect to the other, an internal combustion engine rigidly secured to said housing and having a pivotal connection with one of said truck side frames, driving connections between said engine and said axles, and body supporting springs mounted on said truck side frames.

4. A self-contained power driven truck comprising front and rear axles and wheels thereon, laterally spaced truck side frames mounted on said axles, a gear housing pivotally mounted on said axles to permit the two axles to oscillate vertically, one in respect to the other, an internal combustion engine rigidly secured to said housing and having a pivotal connection with one of said truck side frames, driving connections between said engine and said axles, and thrust bars extended forward from said side frames and adapted to be connected to a truck body.

5. A self-contained power driven truck comprising front and rear axles and wheels thereon, laterally spaced truck side frames mounted on said axles, a gear housing pivotally mounted on said axles to permit the two axles to oscillate vertically, one in respect to the other, an internal combustion engine rigidly secured to said housing and having a pivotal connection with one of said truck side frames, driving connections between said engine and said axles, body supporting springs mounted on said truck side frames, and thrust bars extended forward from said side frames and adapted to be connected to a truck body to relieve said springs from forward and rearward thrusts.

6. The combination with a truck body and front steering wheels, of a rear truck supporting the rear portion thereof and comprising two axles, two pairs of wheels secured on said axles, truck side frames carried by said axles, a gear housing carried by said axles and having pivotal connections permitting the axles to oscillate vertically, the one independently of the other, springs mounted on said side frames and supporting the rear portion of said truck body, and an engine rigidly secured to said housing and swiveled to one of said side frames, said engine having connections for driving said axles.

7. A self-contained power driven truck comprising front and rear axles and wheels thereon, laterally spaced truck side frames mounted on said axles, a gear housing pivotally mounted on said axles to permit the two axles to oscillate vertically, one in respect to the other, an internal combustion engine rigidly secured to said housing and having a pivotal connection with one of said truck side frames, driving connections between said engine and said axles, and a gasolene tank and a radiator connected at one side to said housing and connected at the other side to the engine structure.

In testimony whereof I affix my signature.

WILLIAM JUDSON SMITH.